July 29, 1969 W. J. MAHNKEN ET AL 3,458,096
AUTO RECORD LENGTH CIRCUIT
Filed Dec. 20, 1966 3 Sheets-Sheet 1

INVENTORS.
TOMMY N. TYLER
WALTER J. MAHNKEN
BY FRED W. NICCORE

ATTORNEY.

July 29, 1969   W. J. MAHNKEN ET AL   3,458,096
AUTO RECORD LENGTH CIRCUIT
Filed Dec. 20, 1966   3 Sheets-Sheet 2

INVENTORS.
TOMMY N. TYLER
WALTER J. MAHNKEN
BY FRED W. NICCORE

J. Donald Weber
ATTORNEY.

July 29, 1969  W. J. MAHNKEN ET AL  3,458,096
AUTO RECORD LENGTH CIRCUIT
Filed Dec. 20, 1966   3 Sheets-Sheet 3

INVENTORS.
TOMMY N. TYLER
WALTER J. MAHNKEN
BY FRED W. NICCORE

J. Donald Weber Jr.
ATTORNEY.

United States Patent Office 3,458,096
Patented July 29, 1969

3,458,096
AUTO RECORD LENGTH CIRCUIT
Walter J. Mahnken, Littleton, Fred W. Niccore, Denver, and Tommy N. Tyler, Littleton, Colo., assignors to Honeywell Inc., Minneapolis, Minn., a corporation of Delaware
Filed Dec. 20, 1966, Ser. No. 603,246
Int. Cl. B65h 25/14, 25/32
U.S. Cl. 226—43                    10 Claims

ABSTRACT OF THE DISCLOSURE

A system is provided wherein the number of revolutions of a drive shaft, for example, is converted into an indication representative of the length of material driven or moved by the drive shaft. The system provides a device which automatically and electronically controls a material moving device such that a predetermined length of material is moved.

---

There are many types of recording devices wherein the recording medium, such as magnetic tape, photographic film, paper tape or the like is processed. The recording material is frequently quite expensive. Consequently, accurate control of the material used is desirable. Additionally, many of the present day recording devices operate at extremely high rates of speed wherein the recording medium is driven at commensurately high speeds. Since the drive speed is frequently much higher than is easily controllable within human operator reaction time, it is desirable to utilize automatic shut-off means to avoid unnecessary waste of expensive recording medium.

The system devised and described herewith utilizes semiconductor elements. In particular, this circuit utilizes the so-called "micrologic" or integrated circuitry modules which are now available. Consequently, this circuit is capable of extremely high speed operation as well as exhibiting a very low rate of component failure.

In particular, the system includes a means for detecting the number of revolutions of a drive shaft, circuit means for converting the number of revolutions into electrical signals, means for converting the electrical signals to coded electrical signals, means for operating on the coded electrical signals to produce a control signal, means for utilizing the control signal to perform a control function and means for returning the system to a predefined state wherein a new cycle may be initiated.

Consequently, one object of this invention is to provide a means for measuring the length of a recording medium.

Another object of this invention is to provide a record length measuring system which utilizes solid state semiconductor components.

Another object of this invention is to provide a measuring device which is relatively simple in operation and uncomplicated in configuration.

These and other objects and advantages of the invention will become more readily apparent when the following description is read in conjunction with the attached drawings, in which.

Figure 1:
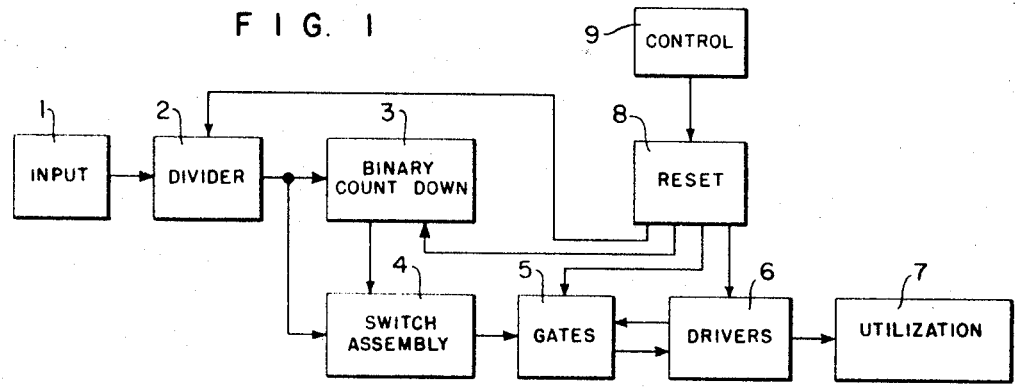
FIGURE 1 is a block diagram of the invention.

Referring now to FIGURE 1, there is shown a block diagram of the system of the instant invention. Input 1 is any suitable means for supplying inputs to the circuit. More particularly, the input supplied to the circuit is representative of some indicia related to the length of travel of a record medium. For example, as described in FIGURE 2, input 1 may be a means which counts the revolutions of a drive shaft which is related to the record medium drive apparatus.

Divider means 2 is a typical divider network configuration. In particular, the divider network includes a plurality of bistable circuits. The bistable circuits are comprised of micrologic circuits commonly known as JK flip-flops. Divider 2 operates on the input signals supplied by input 1 and produces an output signal which is indicative of a predetermined number of input signals. The output signal provided by divider 2 is applied to binary counter means 3 and switch assembly 4.

Binary counter means 3 is a typical counting apparatus configuration. For example, counter means 3 may comprise a plurality of micrologic flip-flops similar to those used in divider 2. Binary counter means 3 counts the signals supplied thereto by divider 2. Binary counter means 3 supplies a plurality of signals to switch assembly 4.

Switch assembly 4 may comprise, for example, a multideck rotary switch. Switch 4 may be connected to have various contacts thereof joined together electrically whereby a coded arrangement is established. Thus, the signals from divider 2 and counter circuit 3 are supplied to switch assembly 4. These input signals produce output signals from switch 4 in accordance with the positioning of the switch.

Signals from switch assembly 4 are applied to gates 5. Gates 5 may comprise any typical gating network configuration which produces the NAND function. In a preferred embodiment, NAND gates 5 include a plurality of micrologic switching circuits.

An output from gate 5 is supplied to driver 6. Driver 6 is a circuit which is utilized to amplify and supply signals to utilization device 7. In addition, driver 6 provides a lock-up signal to gate 5. Utilization device 7 may be any typical device, such as a brake or the like. This utilization device receives an amplified signal from driver 6 and may either supply the signal directly which stops the apparatus or deactivate a switch which controls the prime mover that drives the recording medium.

An external control 9 is a suitable control means which operates to synchronize and otherwise control the operation of the network. For example, control means 9 supplies a signal to reset means 8 at the proper time for resetting the circuit. The operation of control 9 is supervised by suitable means such as the operator of the device. Control 9 may be electrically or mechanically (or both) coupled to switch assembly 4 and operative to start the subject device.

Reset means 8 may be a typical switching network which, upon receipt of any control signal from control means 9, provides an output signal to various circuits such as divider 2, counter means 3, gate 5 and drivers 6. These signals are supplied to reset the circuits to an initial condition, for example, a zero condition. In a preferred embodiment, the reset signal is supplied at the beginning of the operating cycle rather than at the end thereof. This method of operation assures that no spurious pulses have been supplied to and stored in any of the networks whereby an inaccurate counting or similar operation would be performed.

The operation of the system shown in FIGURE 1 is such that the input 1 detects a criterion relating to the rate of movement of the record medium. Divider 2 receives signals from input 1 which represent the criterion detected. These signals may be provided at any arbitrary rate. Divider 2 operates on the signals applied thereto at a very high rate to obtain a change of state at the output thereof for each unit distance input (i.e. foot or meter). The signals from divider 2 are supplied to binary counter 3 and switch assembly 4. Binary counter 3 supplies a plurality of signals in coded arrangement to switch 4. The signals supplied by binary counter 3 are indicative of various counts of signals supplied by divider 2. Thus, switch assembly 4 which receives signals from binary counter 3, as well as from divider 2, provides signals at predetermined times which are indicative of predetermined functions. These signals are supplied to gates 5 in order to produce certain functions by gates 5 which functions permit output signals therefrom. These signals are supplied to driver 6 which may include, as noted supra, amplifying devices which drive the utilization device 7. Utilization device 7 performs a predetermined function in accordance with the signal supplied thereto.

Figure 2:
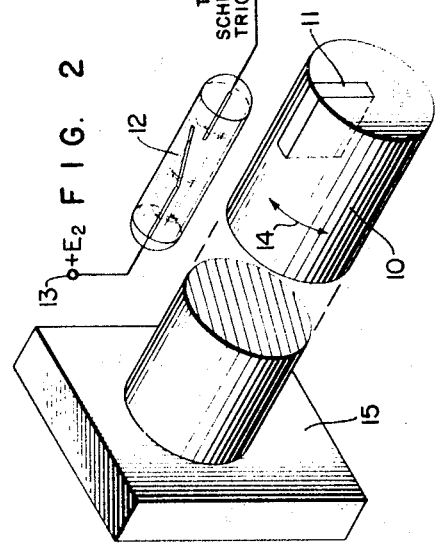
FIGURE 2 is a schematic representation of the shaft revolution counting device.

Referring now to FIGURE 2, there is shown a typical arrangement of the input means shown in FIGURE 1. A shaft 10 has a magnetic element 11 imbedded therein or otherwise affixed thereto. Magnetic element 11 has at least a portion thereof adjacent the surface of shaft 10 and rotates with the shaft. A magnetic reed relay, such as known in the art, is mounted adjacent shaft 10 in juxtaposition to the magnetic element 11. As shaft 10 rotates adjacent magnetic reed relay 12, the normally open gap between the armature and the contact is selectively closed. That is, magnetic element 11 causes the armature of reed relay 12 to move into electrical connection with the contact. Potential source $+E_2$ is connected to the armature of relay 12. When relay 12 is closed, the potential source $+E_2$ at terminal 13 is conductively connected via the armature, to the external circuitry for example a Schmitt trigger, connected to the contact terminal.

Shaft 10, as suggested by arrow 14 may move in either direction of rotation or both. That is, element 15 represents a means for driving and/or being driven by shaft 10. For example, in the instant invention, a record medium is to be moved. Shaft 10 may be connected to a suitable means, such as a capstan, for driving the medium as well as to a suitable prime mover, such as a motor, for driving shaft 10. These elements, which are not shown, are schematically represented by element 15.

The suggested pickup or input means is not meant to be limitative of the invention. In extremely high speed operations, the relay switch may be unable to operate rapidly enough or may experience excessive contact bounce. In such a system, a photoelectric sensing system could be utilized. For example, a photosensitive cell could detect a spot or the like on the shaft. Utilization of other detecting schemes are clearly possible.

Figure 3:
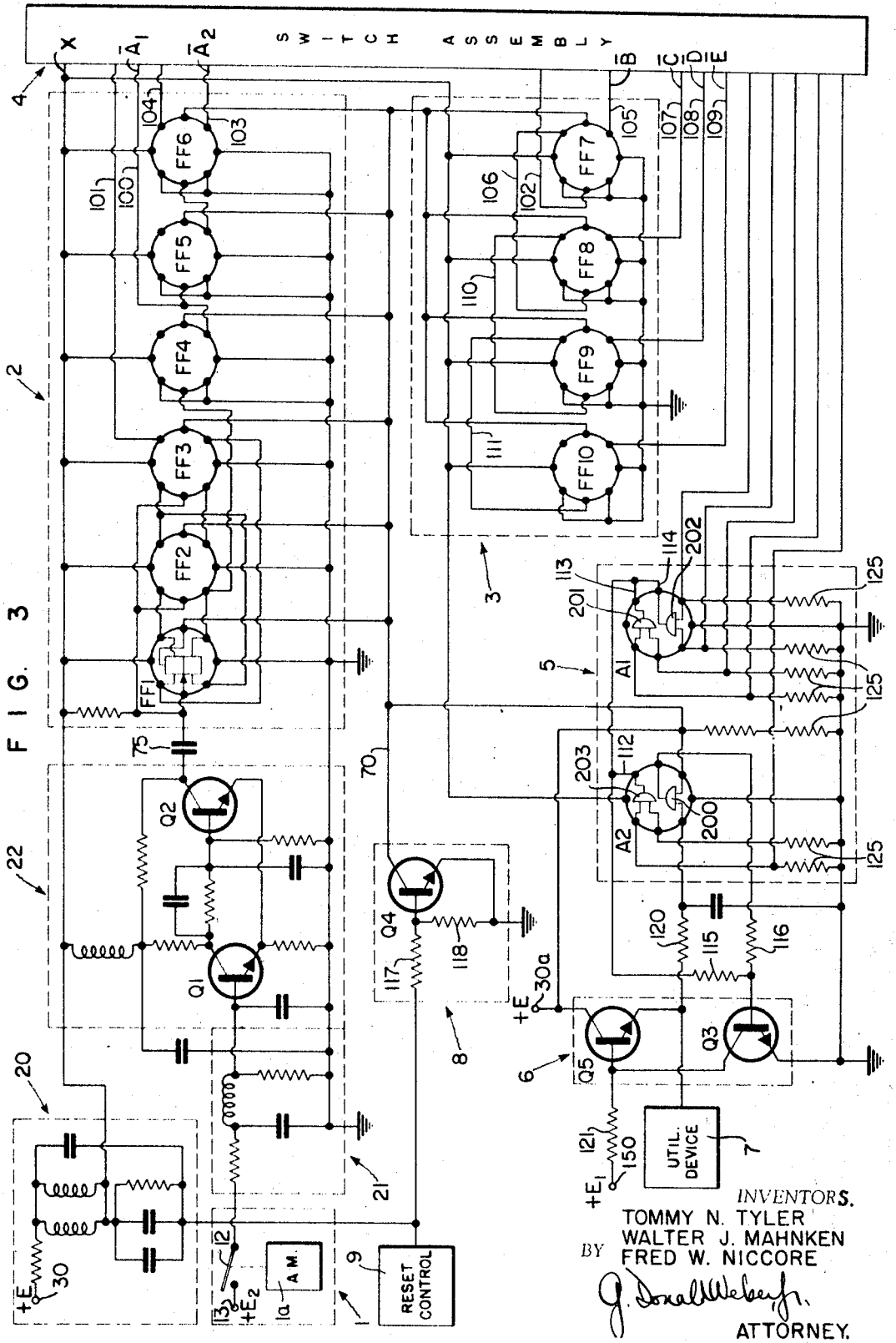
FIGURE 3 is a schematic diagram of the one embodiment of the invention.

Referring now to FIGURE 3, there is shown a schematic diagram of the circuitry for the instant invention. This circuitry is separated into a plurality of blocks and enclosed in dashed lines. Blocks which are similar to blocks shown in FIGURE 1 bear similar reference numerals. Thus, input device 1 is shown as including actuating means for causing the selective operation of switch 12 which is designated as normally opened (NO). Closure of switch 12 by actuating means causes the connection between source 13 and filter network 21. Thus, a potential $+E_2$ is applied to the filter network which comprises a standard type of filter utilizing R, L and C components. Filter network 21 is utilized to eliminate any spurious signals which may be provided due to contact bounce, arcing, or the like, due to closure of switch 12.

The signals supplied from device 1, via network 21, are applied to a Schmitt trigger circuit 22. The circuitry of Schmitt trigger 22 is known in the art and is utilized to shape the signals supplied thereto from the input device.

A voltage regulator network 20 operates on a voltage, for example $+E$, which is supplied to terminal 30. Source $+E$ supplies $+24$ volts in a preferred embodiment. Voltage regulating network 20 produces a well regulated output voltage of approximately $+3.3$ volts. This potential is supplied to Schmitt trigger circuit 22, divider network 2 and to switch assembly 4.

In the embodiment shown in FIGURE 2, the divider circuit 2 includes six flip-flops designated FF1 through FF6. As will appear hereinafter, flip-flops FF5 and FF6 constitute an optional portion of the circuit.

Flip-flops FF1, FF2, FF3 and FF4 are interconnected as shown. The flip-flops FF1 through FF4 operate upon the input signals supplied by Schmitt trigger 22. The four flip-flops FF1–FF4 are interconnected so that the pulses supplied by Schmitt trigger 22 are divided by a factor of 10. That is, in this embodiment a metric measure of the record medium is obtained.

It should be noted that the flip-flops shown in the divider network are the so-called micrologic or integrated circuit flip-flops which are now produced by several manufacturers. Typically, utilizable modules are the Fairchild micrologic modules ML923. Another satisfactory model is the Motorola MC945P.

Flip-flops FF5 and FF6 provide further division when certain switch connections are made in switch assembly 4, which is described hereinafter. However, it may be noted that the output appearing at one output terminal of FF4 is supplied to switch assembly 4 via conductor 100 and to an input of FF5. Assuming initially, that the switch is in the ×1 (times 1) position, the output signal produced by flip-flop FF4 is produced on line 100 and supplied to switch assembly 4. Another output signal is supplied on line 101 and is also applied to switch assembly 4. As will appear hereinafter, the signal supplied on line 101 is supplied as an input signal to binary counter 3 on input line 102 via switch assembly 4.

In the alternative operation, switch assembly 4 is in the ×4 (times 4) mode of operation. In this condition, conductors 100 and 101 are electrically disconnected from switch assembly 4. However, flip-flop FF4 is connected via conductor 100 to an input of FF5. Thus, the signals supplied by the divider network (including FF4) are supplied to a further network comprising flip-flops FF5 and FF6.

In the ×4 mode of operation, the output signals supplied by FF6 on lines 103 and 104 are connected to switch assembly 4. In particular, line 104 is through-connected to binary counter 3 and line 103 is connected to internal contacts in switch assembly 4. It is seen that the ×4 mode of operation provides a multiplication function to the division operation. That is, because of the interconnection of FF5 and FF6, further division of the signals supplied by FF4 is obtained. More particularly, a factor of 4 is inserted into the division process. This option is generally used to permit longer sections of recording medium to be driven. For example, a 60 foot length may be obtained by a setting of 15 feet along with the ×4 mode of operation (i.e., 4×15=60).

Figure 4:
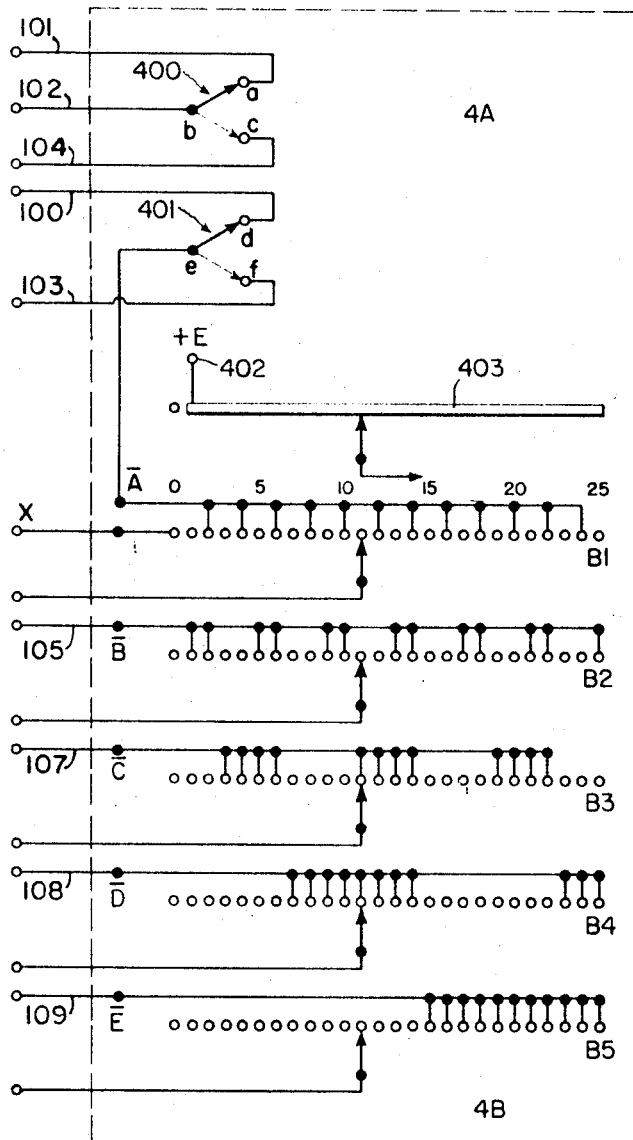
FIGURE 4 is a schematic diagram of the switching circuit shown in FIGURES 1 and 3.

As suggested supra, switch assembly 4 includes two components which are more fully described in FIGURE 4. A first component selectively interconnects the input line 102 of binary counter 3 to the output line 101 or 104, respectively, of FF4 or FF6. The other portion of the switch assembly 4 is connected to the outputs of flip-flops FF7 through FF10 of binary counter 3. The flip-flops FF7 through FF10 in binary counter 3 are similar to flip-flops FF1 through FF6.

Flip-flops FF7 through FF10 are interconnected in standard toggle sequence such that an input signal supplied to input line 102 produces outputs on lines 105 and 106. An output signal produced on line 105 is supplied to switch assembly 4. The output signal on line 106 is supplied to the toggle input of flip-flop FF8. Similarly, flip-flop FF8 supplies an output signal on line 110 to the toggle input of flip-flop FF9. An output is supplied on line 111 from the outut of flip-flop FF9 to the toggle input of flip-flop FF10. The outputs of flip-flops FF7, FF8, FF9 and FF10 appear, respectively, on lines 105, 107, 108 and 109 all of which are connected to switch assembly 4.

Gating circuit 5 comprises a pair of micrologic modules each of which contains a pair of two input gates. That is, four logic inputs are supplied to the modules such that each of the gates operates on two inputs. The inputs to gate circuit 5 are supplied by switch assembly 4. The modules, which are designated as A1 and A2, may be Fairchild micrologic modules ML914 or Motorola MC844P.

As will appear hereinafter, the logic portion of switch assembly 4 supplies signals to the four inputs of the two gates of module A1 and the two inputs of one gate of module A2. The inputs to the gates are connected to ground via pull-down resistors 125 to assure a low level input in the absence of a high level signal. The outputs 112, 113 and 114 of the modules are connected together in a common junction. These outputs represent the outputs of three of the gates in the modules. These gates perform a NAND logic function.

The junction is connected to one terminal of resistor 115. Resistor 115 is connected to the base of NPN transistor Q3 which may be transistor type 2N3904. The emitter electrode of transistor Q3 is connected to ground while the emitter electrode is connected to the base electrode of transistor Q5. Transistor Q5 may be an NPN transistor type 2N697. The emitter electrode of transistor Q5 is connected to utilization device 7. The collector electrode of transistor Q5 is connected to terminal 30a which supplies a substantially constant potential +E. The base electrode of transistor Q5 is connected via resistor 121 to terminal 150. Terminal 150 is representative of a substantially constant potential $+E_1$ where $E_1$ is greater than E.

The emitter electrode of transistor Q5 is further connected via resistor 120 to one input of gate 200 in module A2 to supply a lock-up signal. Another input to gate 200 of module A2 is connected to reset device 8. The output of the aforesaid gate 200 of module A2 is connected via resistor 116 to the base of transistor Q3. Consequently, as will appear hereinafter, with the proper (viz. low level) signals supplied to gates 201 and 202 of module A1 as well as gate 203 of module A2 such that utilization device 7 is turned off, gate 200 (module A2) is rendered operative and supplies a signal to the base of transistor Q3 which is of proper magnitude and polarity to maintain the output signal to utilization device 7 at a proper condition to maintain utilization device 7 turned off.

Reset device 8 comprises transistor Q4 (a type 2N3904 transistor) having the emitted electrode thereof connected to ground and a bias resistor 118 connected between the base electrode and ground. A control means 9 is connected, via resistor 117, to the base of transistor Q4. The collector electrode, by means of which the reset signal is promulgated, is connected to divider 2, counter 3 and gate 5. It should be noted, in the preferred embodiment the reset signal properly initiates the circuit operation whereby spurious counts or signals which may exist in the circuit are eliminated. Moreover, the reset signal is supplied to one input of gate 200 of module A2 in order to condition that gate as suggested supra.

Referring now to FIGURE 4, there is a schematic showing of the switch assembly 4. The first portion of the switch assembly is the multiplier switch 4A. Multiplier switch (schematically) comprises a pair of single pole, double throw, ganged switches 400 and 401. These switches have the contacts a, c, d and f, respectively. Additionally, the armatures b and e selectively engage the aforementioned associated contacts.

Switches 400 and 401 are the switches which interconnect the outputs of divider 2 such that the ×1 or ×4 factor is associated with the divider circuit represented by flip-flops FF1 through FF4. More particularly, as noted supra, flip-flops FF5 and FF6 are utilized only in the ×4 mode of operation. When the position of switches 400 and 401 is as shown in solid line, the ×1 mode of operation is obtained. In particular, output conductor 101 from flip-flop FF4 is connected to terminal a of switch 400. Armature b is connected to input conductor 102 of flip-flop FF7 of binary counter 3. Therefore, in the switch position shown in solid line, the output signal from flip-flop FF4 is connected through switch 400 of switch assembly 4A to an input terminal of flip-flop FF7. Concurrently, output line 100 connected to flip-flop FF4 is also connected to terminal d of switch 401. Armature e of switch 401 is connected to one level of contacts in switch 4B, hereinafter described. Thus, it is seen that the outputs from FF4 are connected to related circuitry when the switches are in the position shown by the solid line which represents the ×1 mode of operation.

When the switches are relocated in the dashed position, the ×4 mode of operation is obtained. That is, output 101 from flip-flop FF4 is connected to terminal a of switch 400 which terminal is disconnected from any other circuitry. Similarly, the connection of conductor 100 to terminal d is electrically disengaged. However, conductor 100 is electrically connected to an input of flip-flop FF5. The outputs 103 and 104 from FF6 are connected to terminals f and c of switches 401 and 400, respectively.

In the ×4 mode of operation, armature b is engaged with contact c whereby an output from flip-flop FF6 is supplied to input 102 of binary counter 103. Additionally, another output of flip-flop FF6 is connected by armature e of switch 401 to the aforesaid first level of switch portion 4B. Thus, it is seen that operation of switch portion 4A, namely the operation of ganged switches 400 and 401, transfers the divider operation from ×1 to ×4 operation.

Referring to switch portion 4B of FIGURE 4, there is shown a switching arrangement which may be a multideck switch. This switch includes a first level having a contact 403 and an armature which is in contact therewith. A terminal 402 is connected to contact 403. A potential source +E is connected to terminal 402 and supplies a substantially constant potential thereto. Additional levels B1, B2, B3, B4 and B5 are shown. The operation of this device is not limited to five levels and more or fewer levels may be utilized in accordance with the necessary requirements.

Adjacent level B1 there is an indicator 0–25 which indicates the length of recording medium which is to be automatically driven or passed through the system. This indication may be on the external casing or panel of the housing in which the system is enclosed. These indications are related to terminals on each of the layers or levels of the switch. The first indication is for zero feet and it is seen that a first terminal of level B1 is connected to a suitable reference potential while the first terminals of the other levels are completely disconnected. This switch position is indicative of zero feet of travel. In this position, the machine is not shut off but rather manual control is effected. It will be seen, that the levels B1 through B5 include coding arrangements whereby the several contracts thereof are connected in accordance with a predetermined code. This code may be related to typical binary coding as is seen by inspection. The armatures for each of the levels is mechanically connected to the other armatures whereby a ganged operation of the switch levels is achieved.

The operator of the device can manually adjust the switch by means of a knob or the like (not shown) to select a desired record length in accordance with the footage (or meters) indications noted supra. The armatures of levels B1 through B5 are at positions adjacent contacts on the levels. The armatures are further connected to inputs of gate 5. The terminals which are connected in the aforesaid coded arrangement are connected to the outputs of flip-flops FF7 through FF10 with the exception of level B1. In level B1 the contact terminals are connected via switch 401 to output conductor 100 or 103.

By properly positioning switch portion 4B, the proper length between 0 to 25 feet may be obtained. By concurrently positioning switch portion 4A in the ×4 mode of operation, the record length may be multiplied by a factor of 4.

The diagram shown in FIGURE 3 represents one embodiment of the invention. In particular, as noted, the diagram shown in FIGURE 3 represents a system for measuring the record length in the metric system. Consequently, divider 2 operates flip-flops F1 through F4 as a dividing network which divides the input signals supplied by Schmitt trigger 22 by a factor of 10. Many times, it is not necessary or desirable to measure record length in a metric system. For example, it may be more desirable to measure the record length in terms of feet. Therefore, it is desirable to provide another embodiment of the invention.

Figure 5:
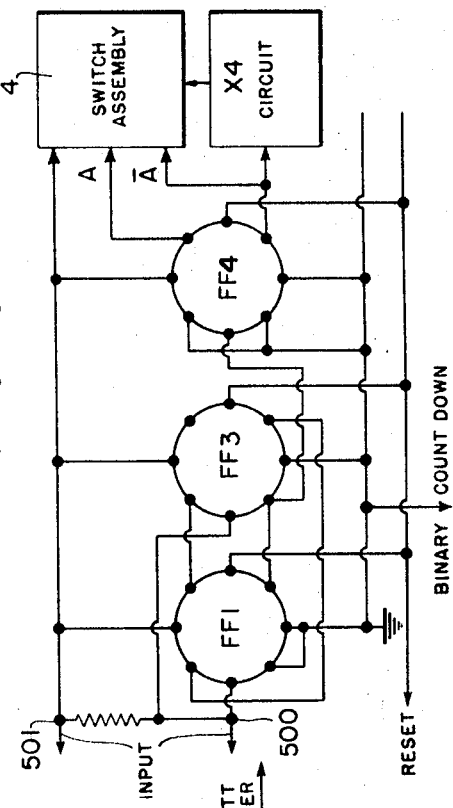
FIGURE 5 is a schematic diagram of another embodiment of the invention.

Referring now to FIGURE 5, there is shown a modification which is made in divider 2 whereby another embodiment of the invention is provided. In FIGURE 5, components which are identical to components of FIGURE 3 bear identical reference numerals.

In FIGURE 5 input signals are applied across the input terminals. Input terminal 500 receives the alternating signals supplied by Schmitt trigger (see FIGURE 3) while terminal 501 receives a reference potential such as is noted supra. The divide-by six circuit portion comprises flip-flops FF1, FF3 and FF4. It is noted that relative to FIGURE 3, flip-flop FF2 has been eliminated. The output and complementary output signals supplied by flip-flop FF1 are supplied to the input signals of flip-flop FF3. Flip-flop FF3 provides a complement output signal which is referred back to flip-flop FF1. In addition, the binary output signal from flip-flop FF1 is applied to the toggle input of flip-flop FF4. The output and complement outputs (A and $\overline{A}$) are supplied to switch assembly 4 as shown in FIGURE 3. Additionally, the complement output $\overline{A}$ is connected to the ×4 circuit (comprising flip-flops FF5 and FF6) as shown in FIGURE 3. The divider shown in FIGURE 5 divides the input signal by six rather than by ten. Other division factors may be utilized. The ×4 mode of operation may be utilized as before by means of switch assembly portion 4A.

Figure 6:
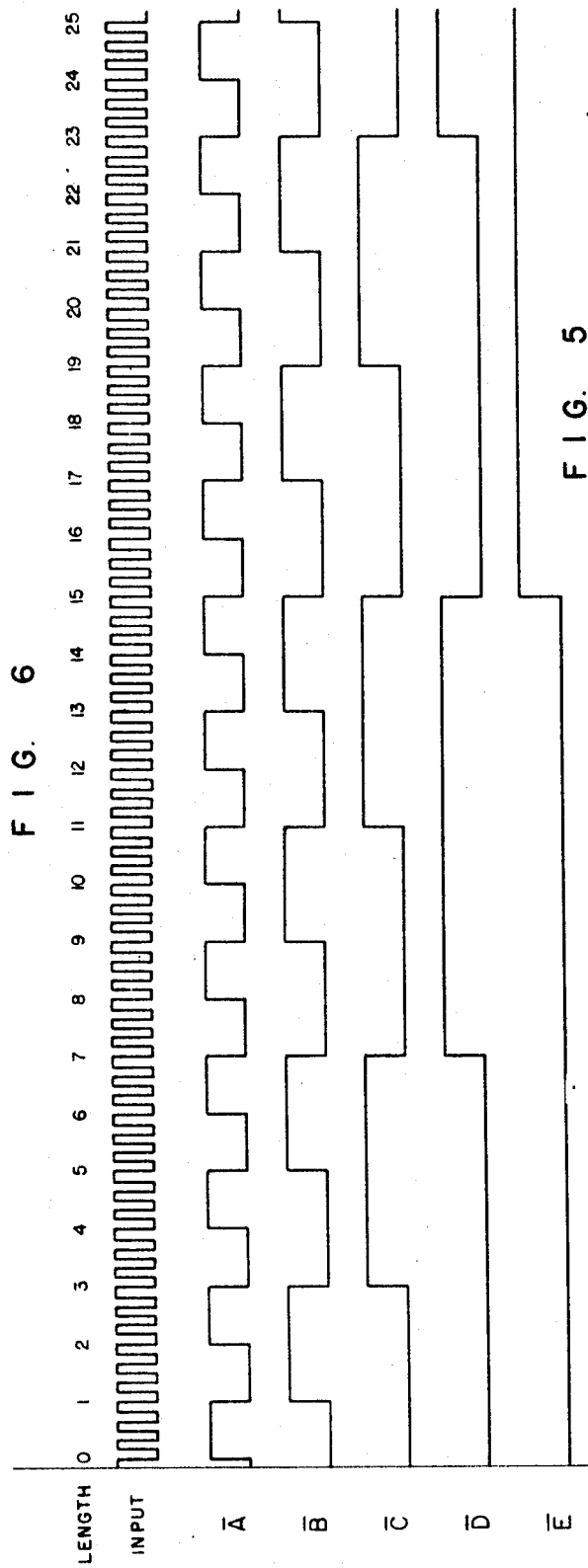
FIGURE 6 is a timing diagram of signals produced by bistable flip-flop circuits utilized in this invention.

Referring now to FIGURE 6, there is shown a timing diagram which is applicable to the subject circuit. This timing diagram is related to the embodiment shown in FIGURE 5 wherein the measurement is in terms of feet. That is, as is readily seen, the input signals are divided by a factor of six. However, it is to be understood that a similar principle controls the metric measuring system with the exception that division would be on the basis of 10 input signals.

In FIGURE 6, the distance or length of travel is indicated as varying between 0 and 25. This length may be in terms of feet or meters as suggested supra. It is seen that input signals from input device 1 are supplied via Schmitt trigger 22 to divider 2 by means of capacitor 75. These input signals are relatively rapid rise time signals. In one embodiment, the drive shaft has a circumference of 4 inches. Thus, when switch 12 is closed three times, one foot of shaft surface has passed the relay switch. The shaft circumference is related to the length of driven record medium. Consequently, three input signals represent 1 foot of record medium length.

Divider network 2 (in this description, the divide-by-six divider shown in FIGURE 5 is utilized) operates upon the input signals and divides the number of input signals by 6 whereby one full cycle output signal is provided for each 6 input signals. This output signal from divider 2 is supplied on conductor 100 and is the $\overline{A}$ signal. This signal is supplied to flip-flop FF5 as well as to switch assembly 4. It is further assumed that switch assembly 4 is set for ×1 mode of operation. Therefore, flip-flops FF5 and FF6 are not connected into the circuit. Consequently, the $\overline{A}$ signals are supplied to binary counter 3. In essence, binary counter 3 operates as a frequency divider such that each of the binaries or flip-flops produces an output signal having twice the duration but half the frequency of the input signal supplied thereto.

Thus, it is seen that two positive going (for example) $\overline{A}$ pulses are required to generate a single $\overline{B}$ pulse. That is, since the flip-flops utilized in this network are trailing edge activated flip-flops, the negative going or trailing edge of one $\overline{A}$ signal sets flip-flop 7 so that a positive going $\overline{B}$ pulse is triggered. The $\overline{B}$ signal is not terminated until a negative going trailing edge of an $\overline{A}$ pulse is again supplied. Again, the succeeding negative going trailing edge of an $\overline{A}$ pulse produces a positive going $\overline{B}$ signal and the following negative going trailing edge of an $\overline{A}$ pulse terminates the $\overline{B}$ signal. It is clear that one $\overline{A}$ signal (specifically the trailing edge thereof) is required to initiate the $\overline{B}$ signal and a second $\overline{A}$ signal (i.e. trailing edge) is required to terminate the $\overline{B}$ signal.

Similar operation relates to the $\overline{C}$, $\overline{D}$ and $\overline{E}$ signals with each of the pulses being related back to the preceding pulse.

The signals ($\overline{A}$ through $\overline{E}$) shown in FIGURE 6 are supplied to the counterpart terminals in switch assembly 4. When switch assembly 4 receives these signals, output signals are supplied on the armatures thereof in accordance with the contact settings which have been preset as described supra. These signals are supplied to associated terminals of gates 5 in order to cause operation thereof.

In describing the operation of the circuit, it is noted that +E is applied to terminals 30, 30a and 402 and may be approximately +24 volts. Power supply 20 operates on this potential and produces a voltage which is utilized to drive the micrologic circuits and is on the order of +3.3 volts. Source +$E_2$, supplied to terminal 13 of input means 1, is typically approximately +24 volts also. The shaft or other actuating means 1A may be continually operable.

In order to permit the instant circuit to function, switch portion 4B is activated whereby the switch is removed from the OFF position and a setting for the desired length of record medium is inserted.

Concurrent with the setting of the length indicating switch, switch 4A may be operated in order to determine the ×1 or ×4 mode of operation. Concurrently with the setting of the switch assemblies, actuation of the circuit is provided. This actuation includes, as an essential part, the application of a +24 volt signal through resistor 117 to the base of transistor Q4 in reset circuit 8. The 24 volt signal turns on transistor Q4 whereby the reset signal supplied to line 70 switches low, for example to ground potential. This signal is applied to divider 2 and counter 3 to place all of the flip-flops in the reset condition and to eliminate any spurious signals which may have been stored therein. Additionally, output $\overline{A}$ is specifically reset to the high level and changes state upon receipt of the first pulse. This assures a certain tolerance in the medium length to be measured. Simultaneously, the low level signal is supplied to one input of gate 200 in gate module A2, thereby clamping one input of gate 200 to a low level potential.

Actuating means 1a continues (or begins) to close the armature of switch 12 whereby the normally open contacts are periodically closed. Signals indicative of the contact closures are supplied to the filter network 21 and to Schmitt trigger 22 where they are properly filtered and shaped, respectively. The shaped signals are applied, via capacitor 75, to divider network 2 wherein the division of these signals by 6 or 10 (along with the multiplying factor 4) is accomplished. Signals after division, are supplied to switch assembly 4 and to binary counter 3. Binary counter 3 supplies a plurality of output signals which are functions of the count of the input signals and are further applied to switch assembly 4. Switch assembly 4 provides coded output signals in accordance with the signals supplied thereto. The output signals from switch assembly 4 are applied to gates 201, 202 and 203. When the signals supplied to all three gates are all low level signals, a high level output signal is supplied, via resistor 115, to the base of transistor Q3. This high level signal turns on transistor Q3 thereby effecting a connection between the base of transistor Q5 and ground. The application of a ground potential signal to the base of emitter follower Q5 causes this transistor to be turned off whereby the potential at the emitter of transistor Q5 switches from +24 to 0. The zero output signal at the emitter of transistor Q5 is supplied to utilization device 27 as well as to another input of gate 200. The concurrent application of low level signals at the two inputs of gate 200 produces a high level output signal which is applied via resistor 116 to the base of transistor Q3 thereby locking the driver network 6 into a condition wherein a low level output signal is provided to utilization device 7.

The low level signal supplied to utilization device 7 is effective to terminate the operation thereof. For example, utilization device 7 may include a relay connected to the drive mechanism which moves the record medium. Such a relay would be rendered operative when the drive switch was initially activated to start the process. The application of the low level output signal by transistor Q5 is indicative of the attaining of the preset record length. Consequently, this low level output signal is effective to terminate the operation of the utilization device or relay or the like.

Thus, it has been shown that this invention provides a circuit wherein a preselected length of record medium may be moved in a recording system. The precision of the system can be controlled by means of adequate sensing means and sufficient counting or dividing binaries. The type of recording medium, and the individual components recited in the foregoing description are not meant to be limitative of the invention. Rather, it is understood that certain variations and modifications may be made to the specific elements in the invention. For example, it may be desirable to include buffer amplifiers at the outputs of the flip-flop circuits for improved operation. However, so long as the inventive concepts are not avoided, such variations and modifications are meant to be included within the scope of this invention.

The embodiments of the invention in which an exclusive property or privilege is claimed are defined as follows:

1. Apparatus for measuring elongated material comprising input means for producing signals as a function of the length of the elongated material, first counter means for counting the signals produced by said input means, second counter means connected to said first counter means to count signals produced thereby, first and second switching means, said first switching means selectively connecting said first and second counter means to said second switching means, and output means connected to said second switching means and operative to effect a control function in response to the condition of said second switching means.

2. The apparatus recited in claim 1 wherein said second switching means comprises electronic gating means connected to said first switching means, said electronic gating means being selectively operative in accordance with the array of signals supplied thereto, said electronic gating means supplying output signals indicative of the array of signals supplied by said first switching means, said output means being connected to receive signals from said electronic gating means.

3. The apparatus recited in claim 1 including third counter means selectively connected between said second counter means and said first switch means, said third counter means selectively varying the signal supplied to said second counter means and said first and second switching means by said first counter means.

4. The apparatus recited in claim 1 including manual control means, said manual control means rendered operative only when said first switching means is in a predetermined position, said manual control means being rendered ineffective to control said apparatus when said first switch means is not in said predetermined position.

5. The apparatus recited in claim 1 including driver means, said driver means connected between said second switching means and said output means, said driver means selectively providing different predetermined voltage levels to said output means to control the operation thereof as a function of the condition of said second switching means, said driver means including a latching circuit whereby the voltage level supplied to said output means is maintained.

6. The apparatus recited in claim 1 wherein said input means includes waveshaping circuit means for producing uniform signals to be operated upon by said first counter means whereby more accurate operation is achieved.

7. The apparatus recited in claim 1 wherein each of the counter means includes a plurality of bistable circuits.

8. The apparatus recited in claim 1 including control means for selectively resetting the system to an initial condition.

9. The apparatus recited in claim 8 including means for operating said control means, said means for operating and said control means operative to initiate the operation of said apparatus whereby said initial condition is inserted into the apparatus prior to the production of the signals by said input means in order to avoid inaccurate operation.

10. The apparatus recited in claim 1 wherein said input means includes means for detecting the revolutions of a drive shaft, and said output means comprises a switching means for terminating the operation under control, said revolutions of said drive shaft being related to the length of a material being driven thereby, said operation being the measurement of said material such that termination of said operation indicates a predetermined measurement has been achieved.

References Cited

UNITED STATES PATENTS

| | | |
|---|---|---|
| 2,923,921 | 2/1960 | Shapin. |
| 3,248,030 | 4/1966 | Ganzhorn _____ 226—43 X |
| 3,270,930 | 9/1966 | Emerson _____ 226—43 X |
| 3,322,961 | 5/1967 | Harrison et al. _____ 226—33 X |
| 3,339,815 | 9/1967 | Fredkin _____ 226—43 X |

ALLEN N. KNOWLES, Primary Examiner